United States Patent
Andrew et al.

(10) Patent No.: US 7,984,004 B2
(45) Date of Patent: Jul. 19, 2011

(54) QUERY SUGGESTION GENERATION

(75) Inventors: Galen Andrew, Redmond, WA (US);
Sooho Park, Cambridge, MA (US);
Robert L. Rounthwaite, Fall City, WA (US); Silviu-Petru Cucerzan, Redmond, WA (US); Jamie Paul Buckley, Redmond, WA (US); Joanna Chan, Kirkland, WA (US)

(73) Assignee: Microsoft Corporation

( * ) Notice: Subject to any disclaimer, the term of this patent is extended or adjusted under 35 U.S.C. 154(b) by 760 days.

(21) Appl. No.: 12/015,519

(22) Filed: Jan. 17, 2008

(65) Prior Publication Data
US 2009/0187515 A1 Jul. 23, 2009

(51) Int. Cl.
*G06F 17/00* (2006.01)
*G06F 7/00* (2006.01)
*G06F 17/30* (2006.01)
*G06N 5/00* (2006.01)

(52) U.S. Cl. .......... 706/45; 707/706; 707/719; 707/721; 707/722

(58) Field of Classification Search ....................... 706/45
See application file for complete search history.

(56) References Cited

U.S. PATENT DOCUMENTS

| | | | |
|---|---|---|---|
| 6,006,225 A | | 12/1999 | Bowman et al. |
| 7,136,845 B2 | | 11/2006 | Chandrasekar et al. |
| 7,231,375 B2 | | 6/2007 | Ratnaparkhi et al. |
| 2003/0018659 A1 | * | 1/2003 | Fuks et al. .................... 707/500 |
| 2004/0215606 A1 | * | 10/2004 | Cossock ........................... 707/3 |
| 2005/0033711 A1 | * | 2/2005 | Horvitz et al. .................. 706/50 |
| 2005/0234879 A1 | | 10/2005 | Zeng et al. |
| 2006/0085391 A1 | | 4/2006 | Turski et al. |
| 2006/0167896 A1 | | 7/2006 | Kapur et al. |
| 2006/0190436 A1 | | 8/2006 | Richardson et al. |
| 2006/0190447 A1 | | 8/2006 | Harmon et al. |
| 2006/0248078 A1 | * | 11/2006 | Gross et al. ....................... 707/5 |
| 2007/0078828 A1 | | 4/2007 | Parikh et al. |
| 2007/0208738 A1 | | 9/2007 | Morgan |

OTHER PUBLICATIONS

Cucerzan, et al., "Query Suggestion based on User Landing Pages". SIGIR'07, Jul. 23-27, 2007, Amsterdam, Netherland, pp. 1-2
"Query Expansion", Retrieved at <<http://nlp.stanford.edu/IR-book/html/htmledition/node135.html>>, Retrieved Date: Oct. 5, 2007, pp. 1-2.
White, et al., "Comparing Query Logs and Pseudo-Relevance Feedback for Web-Search Query Refinement", SIGIR'07, Jul. 23-27, 2007, Amsterdam, The Netherlands. pp. 1-2.
Shen, et al., "Mining Web Query Hierarchies from Click through Data". Retrieved at <<http://ihome.ust.hk/~dshen/papers/aaai07.Shen.pdf>>, Retrieved Date: Oct. 5, 2007, pp. 1-6.
Chen, et al., "Less is More: Probabilistic Models for Retrieving Fewer Relevant Documents", in Proceedings of ACM SIGIR 2006, Aug. 6-11, Seattle, Washington, USA. 2006. pp. 1-8.

* cited by examiner

*Primary Examiner* — Michael Holmes
*Assistant Examiner* — Ben M Rifkin

(57) ABSTRACT

Described herein is a system that facilitates assigning indications of usefulness to query suggestions. The system includes a query suggestion generator component that receives a query and generates a query suggestion based at least in part upon the received query. A model component outputs an indication of usefulness with respect to the query suggestion, wherein the model component is a machine-learned model of user behavior with respect to query suggestions.

18 Claims, 12 Drawing Sheets

QUERY SUGGESTION GENERATION

BACKGROUND

Search engines have enabled users to quickly access information over the Internet. Specifically, a user can issue a query to a search engine and peruse ranked results returned by the search engine. For example, a user can provide a search engine with the query "Spider" and be provided with web pages relating to various arachnids, web pages relating to automobiles, web pages relating to films, web pages related to web crawlers, and other web pages. Search engines may also be used to return images to an issuer of a query, academic papers, videos, and other information.

As search engine technology has developed, search engines have been able to provide query suggestions to users. Query suggestions are alternate queries displayed to users of a search engine in the context of their original query. In a particular example, a user can provide a query to a search engine and the search engine returns ranked search results in response to the query. The search engine can also provide query suggestions that are in some way related to the originally provided query. The query suggestions are typically shown as hyperlinks that are selectable by the user. The user may select a search using a suggested query if they believe it will help them to navigate to their desired page or satisfy their informational need better than the original query. If the user selects a suggested query, the search engine performs a search using the suggested query and provides ranked search results that correspond to the suggested query.

There are several mechanisms used to provide query suggestions to users. One mechanism is to search for narrow query suggestions, which are queries that include the query issued by the user. For instance, if a user issues a query "spider", query suggestions provided to the user may be "poisonous spider", "identifying spiders", "Spider car", "spider solitaire", "spider web", and/or other queries that include the term "spider." Conventionally, however, query suggestions are determined heuristically, and thus may not accurately reflect the needs of the user.

SUMMARY

The following is a brief summary of subject matter that is described in greater detail herein. This summary is not intended to be limiting as to the scope of the claims.

Various technologies relating to training and using a model of user behavior with respect to query suggestions are described herein. In general, users' past interactions with queries and query suggestions can be used to model user behavior with respect to query suggestions, and thus provide users with query suggestions. More specifically, features of queries and corresponding query suggestions can be analyzed and used to train a model of user behavior with respect to query suggestions. Such features used to train the model of user behavior may include a type of transformation of a query string—e.g., whether terms have been added, deleted, or substituted, which words were added, deleted, or substituted for, how frequently added words are used in queries, and the like. Other features that can be used to train the model include features derived from query logs, such as frequency of submission of certain query suggestions, popularity of a query suggestion relative to an originally issued query, frequency that a query suggestion follows a query in a sequence entered by users, etc. Still other features that can be used to train the model include features derived from sets of results retrieved by a search engine for queries and corresponding query suggestions, such as a number of results retrieved, an amount of overlap between search results, etc.

Queries and suggestions for which data has been collected can be analyzed and features of the query/query suggestions can be used to train the model, which may be a logistic regression model, for example. The trained model may then be used to estimate the quality of query/query suggestion pairs, even ones that are rare or non-existent in training data, because they will share features with queries and query suggestions that exist in training data.

The model of user behavior with respect to query suggestions can be used as follows, for example. A user can provide a query (e.g., to a search engine), and candidate query suggestions can be generated based at least in part upon the query. Features of the query and query suggestions can be analyzed, and based at least in part upon the analysis, the model can be used to individually generate an indication of usefulness for each query suggestion. In an example, the indication of usefulness may be a probability that a user will select the query suggestion. The query suggestions can then be displayed to the user in an order corresponding to their indications of usefulness.

Other aspects of the present application will be appreciated upon reading and understanding the attached figures and description.

DETAILED DESCRIPTION

Figure 1:
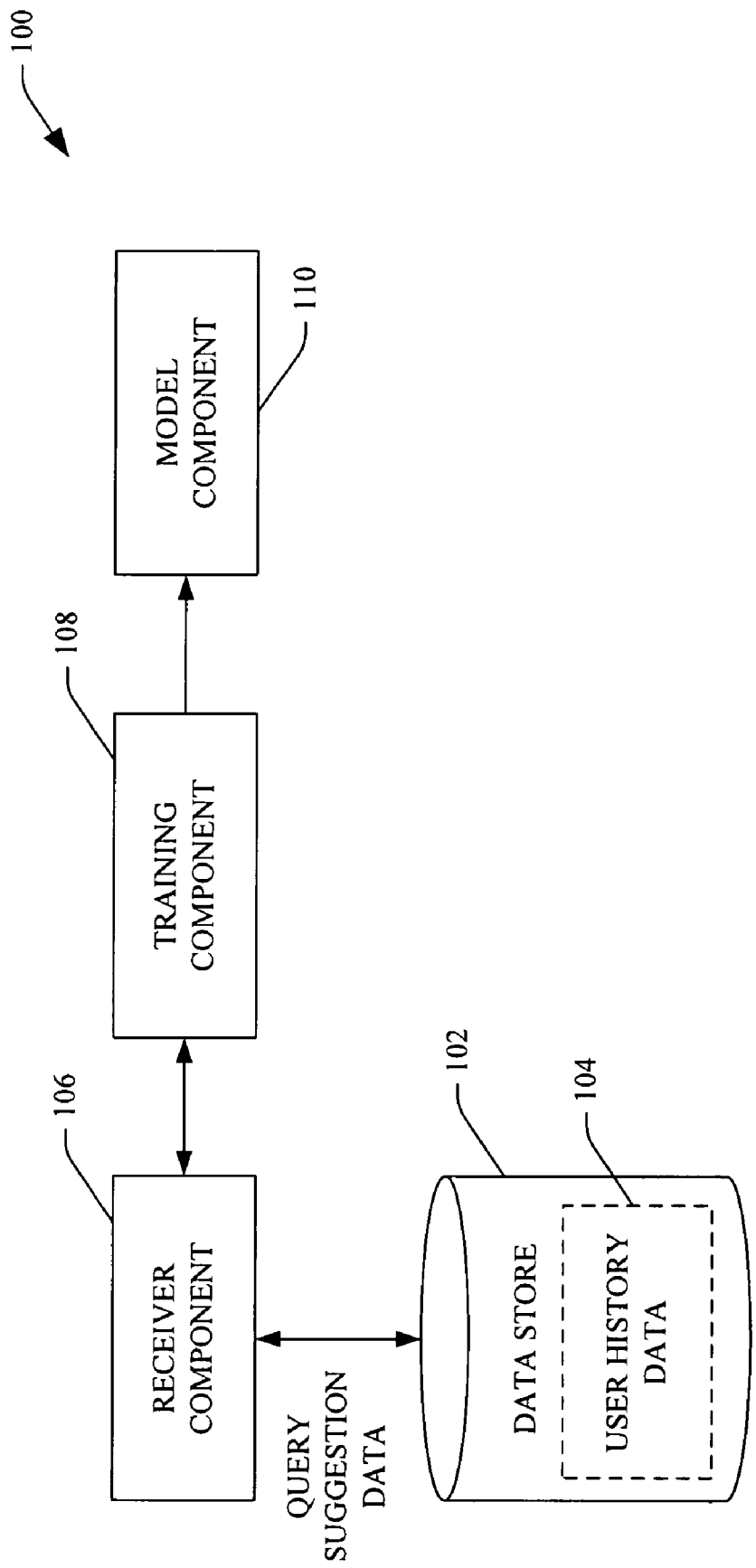
FIG. 1 is a functional block diagram of an example system that facilitates training a model component that models user behavior with respect to query suggestions.

Various technologies pertaining to training a model of user behavior with respect to query suggestions and providing query suggestions to users will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates training a model component that models user behavior with respect to query suggestions is illustrated. The system 100 includes a data store 102 that retains user history data 104. With more particularity, the user history data 104 may include data pertaining to query suggestions, such as queries provided to a search engine, search results returned in response to the queries, query suggestions provided in response to the queries, search results corresponding to the query suggestions, query suggestions selected, search results corresponding to selected query suggestions that are selected, amongst other data. The user history data 104 may be accumulated by monitoring search engine activity, for example, by way of a toolbar.

A receiver component 106 receives a subset of the user history data 104. For instance, the receiver component 106 may provide a request to the data store 102 for a subset of the user history data 104. The receiver component 106 may then receive the subset of the user history data 104 in response to the request.

A training component 108 is in communication with the receiver component 106 and receives the subset of the user history data 104 from the receiver component 106. Again, the training component 108 may provide the receiver component 106 with a request for the subset of the user history data 104 and the training component 108 may receive the subset of the user history data 104 in response to the request. The training component 108 can train a model component 110 with the subset of the user history data 104, wherein the model component 110 acts as model of user behavior with respect to query suggestions. For instance, the training component 108 can train the model component 110 using text of queries, click behavior on search results of queries, content of a page that has been selected upon selection of a query suggestion, frequency of selection of a particular query suggestion, overlap of results with respect to a query and a proffered query suggestion, page rank data, a number of words in common between a query and a corresponding query suggestion, length of a query, relative frequency of a query suggestion with respect to a query, and/or any other suitable data.

Other features that may be used to train the model component 110 include a type of transformation of the query string—for instance, whether terms have been added, deleted, and/or substituted from an original query, which words were added, deleted, and/or substituted, frequency of use of added, deleted, and/or substituted words or phrases, whether named entities have been added or deleted, and/or the like. Further, for instance, features including features derived from query logs can be used to train the model component 1 10. These features may include, for example, how often a suggested query is submitted, how much more or less popular is a query suggestion relative to an original query, frequency that a query suggestion follows a certain query in a sequence entered by a user, and/or the like. Still further, features including features derived from a set of search results retrieved by a search engine for a particular query and/or query suggestion can be used when training the model component 110. Such features can include a number of search results retrieved with respect to a query and suggested query, an amount of overlap of search results, etc. Once trained, the model component 110 can estimate quality of query/query suggestion pairs, even ones that are rare or non-existent in the user history data 104, as such query/query suggestion pair will share some features with queries and query suggestions that exist in the user history data 104.

The model component 110, for example, may be or include a logistic regression model, a multi-class logistic regression model, an artificial neural network, or any other suitable model. For example, the model component 110 when trained can be used to ascertain which particular characteristics of a query and/or query suggestion are desirable to users in general, a collection of users, or a single user. In other words, the model component 110 can be used to determine what characteristics of a query and/or query suggestion make users likely to interact with a query suggestion. Still further the model component 110 component may be used to determine likely user behavior given certain data and a particular context.

The model component 110 may be trained with respect to users in general, with respect to a certain group of users, or with respect to a single user. For instance, the user history data 104 that is used to train the model component 110 may include data that is representative of how users in general interact with queries, query suggestions, and/or corresponding search results. In another example, the user history data 104 used to train the model component 110 may be collected from a particular group of users, wherein the group of users can be selected based upon demographic information, known interests, and/or the like. In yet another example, the user history data 104 used to train the model may be collected from a single user, such that the model component 110 can model behavior of the single user with respect to queries and/or query suggestions.

Figure 2:
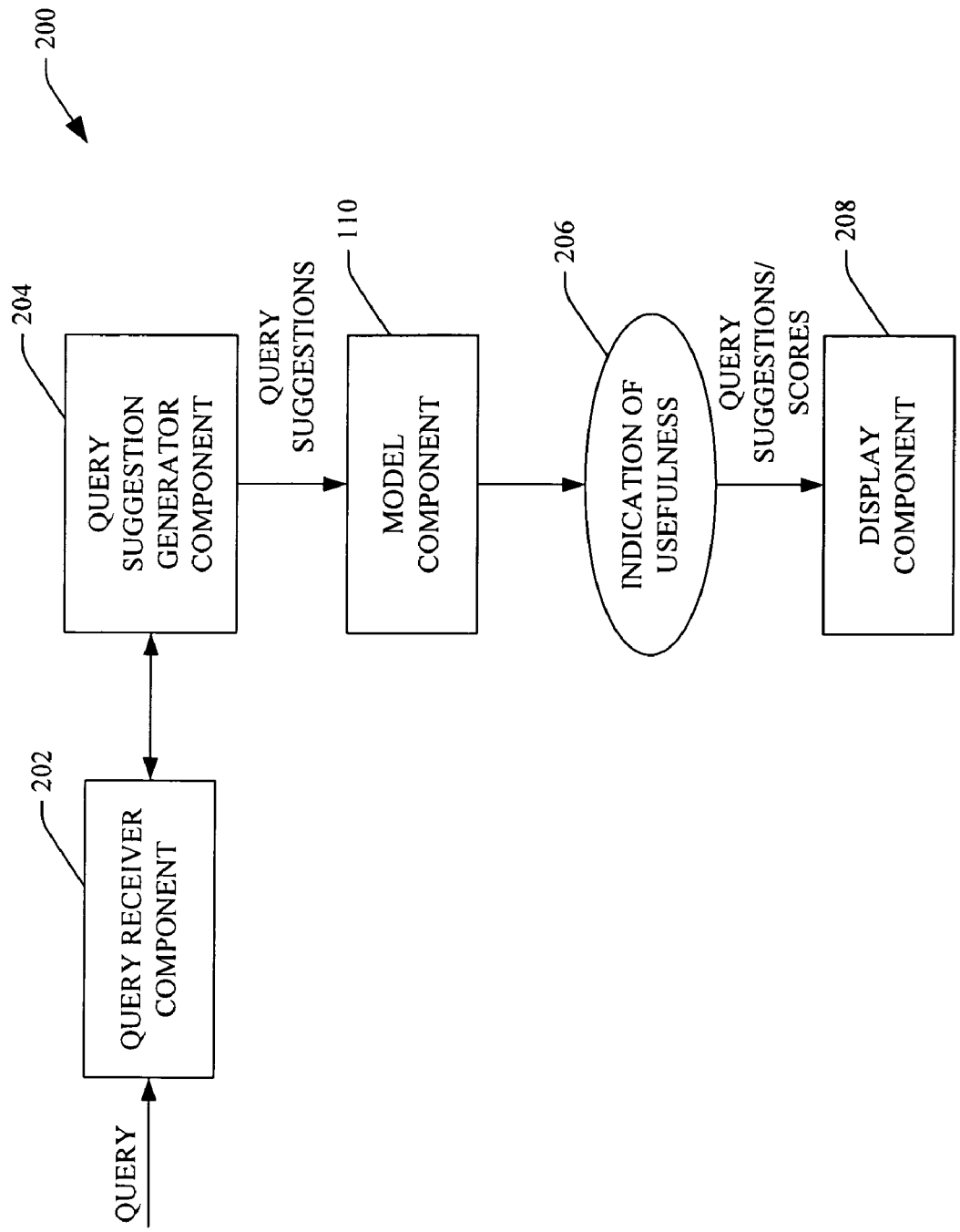
FIG. 2 is a functional block diagram of an example system that facilitates generating indications of usefulness for query suggestions.

Now turning to FIG. 2, an example system 200 that facilitates assignment of an indication of usefulness of a query suggestion is illustrated. The system 200 includes the model component 110 that has been trained as described above. The system 200 additionally includes a query receiver component 202 that receives a query from a user. The query may be a complete query or partial query. In an example, the query receiver component 202 may be a field that is used to provide queries to a search engine. A query suggestion generator component 204 receives the query from the query receiver component 202 and generates at least one query suggestion based at least in part upon the query. In an example, the query receiver component 202 can provide characters to the query suggestion generator component 204 as the characters are received from a user.

The query suggestion generator component 204 can use any suitable manner for generating query suggestions. For instance, the query suggestion generator component 204 can generate query suggestions that include the received query. Pursuant to an example, the received query may be "spider", and the query suggestion generator component 204 can generate "poisonous spider" as a suggested query. For instance, the query suggestion generator component 204 can review number of page views for certain pages, page rank information, and construct queries based at least in part upon such information.

In another example, the query suggestion generator component 204 can review query logs and locate common query refinements that exist in the query logs, and generate query suggestions based at least in part upon common refinements. In yet another example, the query suggestion generator component 204 can follow links of search results with respect to the query and determine a query that would be effective to return web pages linked to certain search results. The query suggestion generator component 204 may then output the determined query as a query suggestion.

In still yet another example, the query suggestion generator component 204 can generate query suggestions as characters are received by the query receiver component 202. For instance, the query receiver component 202 may receive a letter "s", and the query suggestion generator component 204 can generate multiple query suggestions based upon such letter. The query receiver component may then receive the letter "p", and the query suggestion generator component 204 can generate query suggestions based upon the characters "sp." For instance, the query suggestion generator component 204 can generate query suggestions "sprint", "sports", "spyware", and "spiders." The query receiver component 202 may then receive the letter "i" from the user, and the query suggestion generator component 204 can generate multiple queries based upon the characters "spi" (e.g., spiders, Spiderman, Spriegel, amongst other queries).

The model component 110 can receive one or more query suggestions generated by the query suggestion generator component 204 and can output an indication of usefulness 206 of the query suggestion(s) with respect to the query and/or the issuer of the query. More specifically, the model component 110 can calculate feature values of the generated query suggestions (e.g., length of queries, amount of overlap of search results, and other values of features described above) and use such values to generate the indication of usefulness 206 of the query suggestion. In an example, the indication of usefulness 206 may be a probability that the issuer of the query will select the query suggestion. In another example, the indication of usefulness 206 may be a probability that a user will interact with search results that correspond to the query suggestion. In still another example, the indication of usefulness 206 may accord to some metric of user satisfaction (e.g., a metric determined by way of one or more user satisfaction surveys). In yet another example, the indication of usefulness 206 may be a probability that the issuer of the query will locate desired information.

A display component 208 can receive the indication of usefulness 206 of a query suggestion and display a query suggestion based at least in part upon the indication of usefulness 206. In a particular example, the query suggestion generator component 204 can generate multiple query suggestions. The model component 110 can receive the query suggestions and generate an indication of usefulness for each query suggestion. The display component 208 can receive the query suggestions and corresponding indications of usefulness and display query suggestions based at least in part upon their corresponding indications of usefulness. For example, the display component 208 can display a threshold number of query suggestions that correspond to highest indications of usefulness to a user in an order that corresponds to the indications of usefulness to the user. The display component 208 may display the query suggestions as selectable links, for instance.

Figure 3:
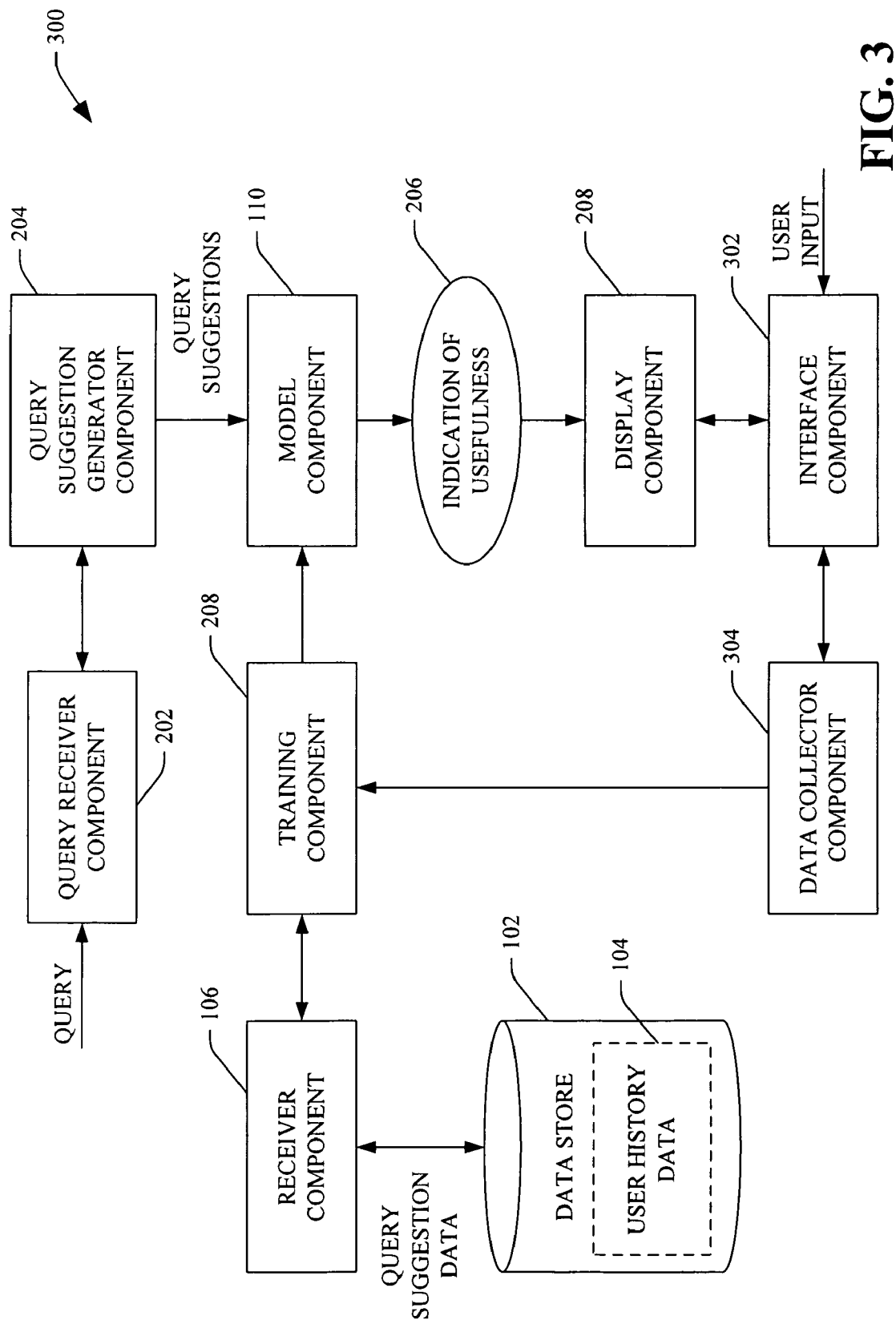
FIG. 3 is a functional block diagram of an example system that facilitates training a model component that models user behavior with respect to query suggestions.

With reference now to FIG. 3, an example system 300 that facilitates training a model component that models user behavior with respect to query suggestions is illustrated. The system 300 includes the data store 102 that includes the user history data 104, the receiver component 106, and the training component 108, which operate in conjunction as described above to train the model component 110. The system 300 further includes the query receiver component 202, the query suggestion generator component 204, and the display component 208, which operate in conjunction with the model component 110 as described above to display particular query suggestions to the user.

The system 300 further includes an interface component 302 that can receive user input with respect to one or more query suggestions displayed to a user by the display component 208. For instance, the interface component 302 can receive user input that indicates that the user wishes to select a particular query suggestion, a certain search result, a new query, or other suitable information. A data collector component 304 collects data pertaining to the user input received by the interface component 302. For instance, the data collector component 304 can collect queries provided by users, query suggestions provided with respect to the collected queries, search results selected by users, and other information.

The training component 108 can receive data collected by the data collector component 304 and further train the model component 110 based at least in part upon such data. Accordingly, as additional data is collected, the model component 110 can become more apt in modeling user behavior with respect to query suggestions. Moreover, the model component 108 can use machine learning to infer how the model component 110 should be parameterized with respect to certain query suggestion features and/or users or groups of users. Pursuant to an example, the model component 110 can learn patterns in the user history data 104 and data collected by the data collector component 304 and assign weights to parameters of the model component 110, such that certain features of query suggestions are emphasized over other features.

Figure 4:
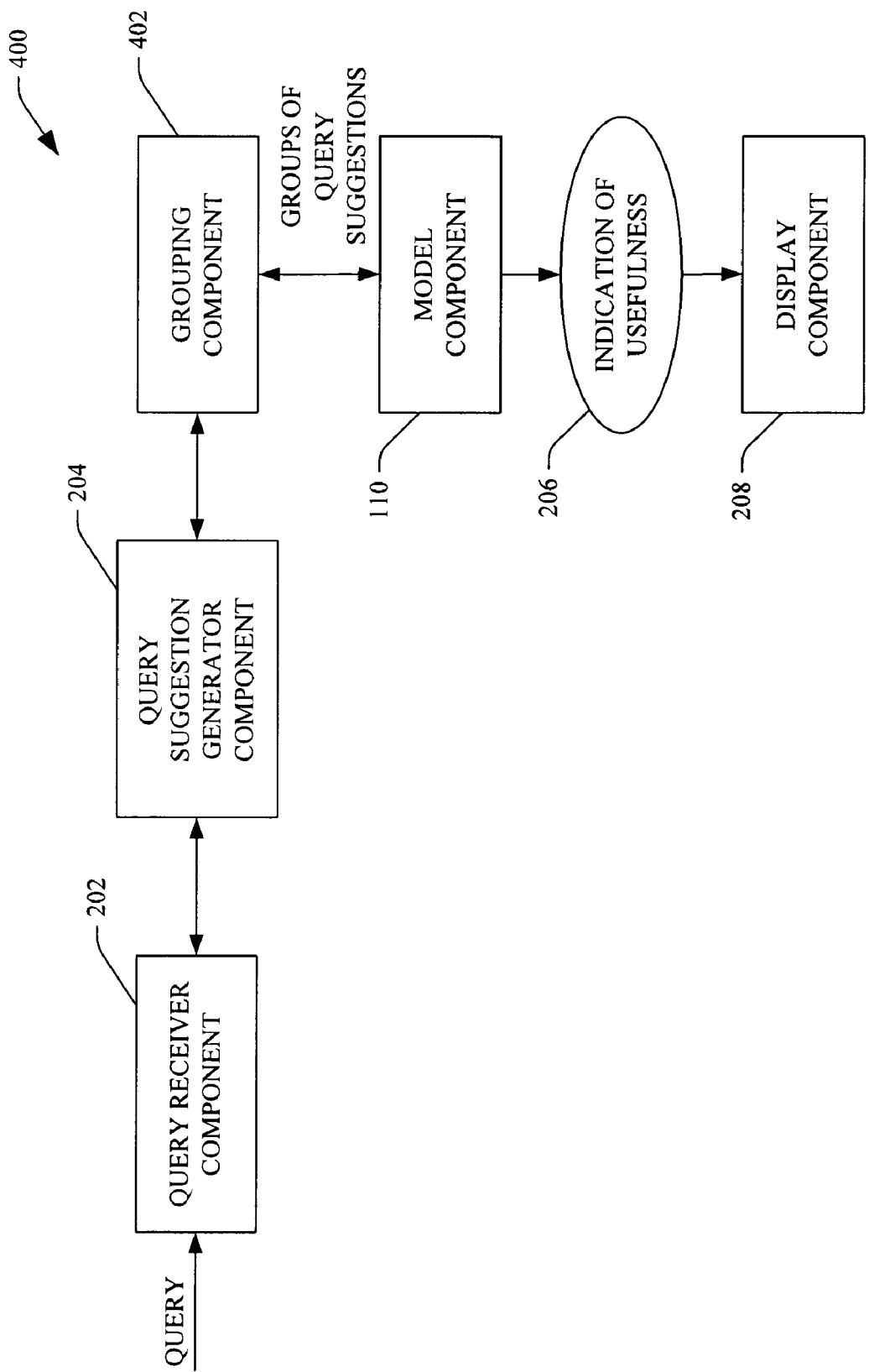
FIG. 4 is a functional block diagram of an example system that facilitates generating indications of usefulness for groups of query suggestions.

Now turning to FIG. 4, an example system 400 that facilitates providing a user with query suggestions is illustrated. The system 400 includes the query receiver component 202 and the query suggestion generator component 204, which operate as described above. The system 400 further includes a grouping component 402 that selectively groups query suggestions output by the query suggestion generator component 204. Specifically, the query suggestion generator component 204 can generate a finite number of query suggestions for a given query. The grouping component 402 can then group query suggestions in any suitable manner. The model component 110 can receive several different groups of query suggestions and assign indications of usefulness to each of the groups of query suggestions created by the grouping component 402. The display component 208 may then display query suggestions to an issuer of a query that are in the group of query suggestion that has been assigned a highest indication of usefulness to the user.

As noted above, the grouping component 402 can use any suitable manner of grouping query suggestions output by the query suggestion generator component 204. For instance, if a user can be provided with five query suggestions at once, the grouping component 402 can create groups that include five query suggestions. In another example, if the query suggestion generator component 204 provides the grouping component 402 with a relatively small number of query suggestions, the grouping component 402 may use a greedy algorithm and output every possible grouping of query suggestions. If grouping in such a manner would be inefficient or impractical, the grouping component 402 can group query suggestions, for instance, based at least in part upon overlap in search results that correspond to query suggestions. For example, it may be desirable to create groups of query suggestions that correspond to diverse search results.

Different groups of query suggestions may then be provided to the model component 110, and the model component 110 can output the indication of usefulness 206 with respect to each group of query suggestions. For example, the model component 110 can assign a first indication of usefulness to a first group of query suggestions, a second indication of usefulness to a second group of query suggestions, etc. As with individual query suggestions, the model component 110 can use various mechanisms when outputting the indication of usefulness 206. For instance, the indication of usefulness 206 may be a probability that a user will select a query suggestion in the group, whether the user will interact with search results corresponding to query suggestions in the group, etc.

Still further, the model component 110 and the grouping component 402 can act in conjunction when determining how to group query suggestions. For instance, individual query suggestions may be provided to the model component 110, and the model component 110 can output an indication of usefulness for each query suggestion. A first query suggestion that corresponds to a highest indication of usefulness may be provided to the grouping component 402. The model component 110 may then individually analyze the query suggestions again, and determine an indication of usefulness for each of the query suggestions given that the first query suggestion has already been selected. A second query suggestion that corresponds to a highest indication of usefulness given the aforementioned constraint may then be provided to the grouping component 402. Once a threshold number of query suggestions are grouped, the display component 208 can display the group of query suggestions to the user that issued the query.

Figure 5:
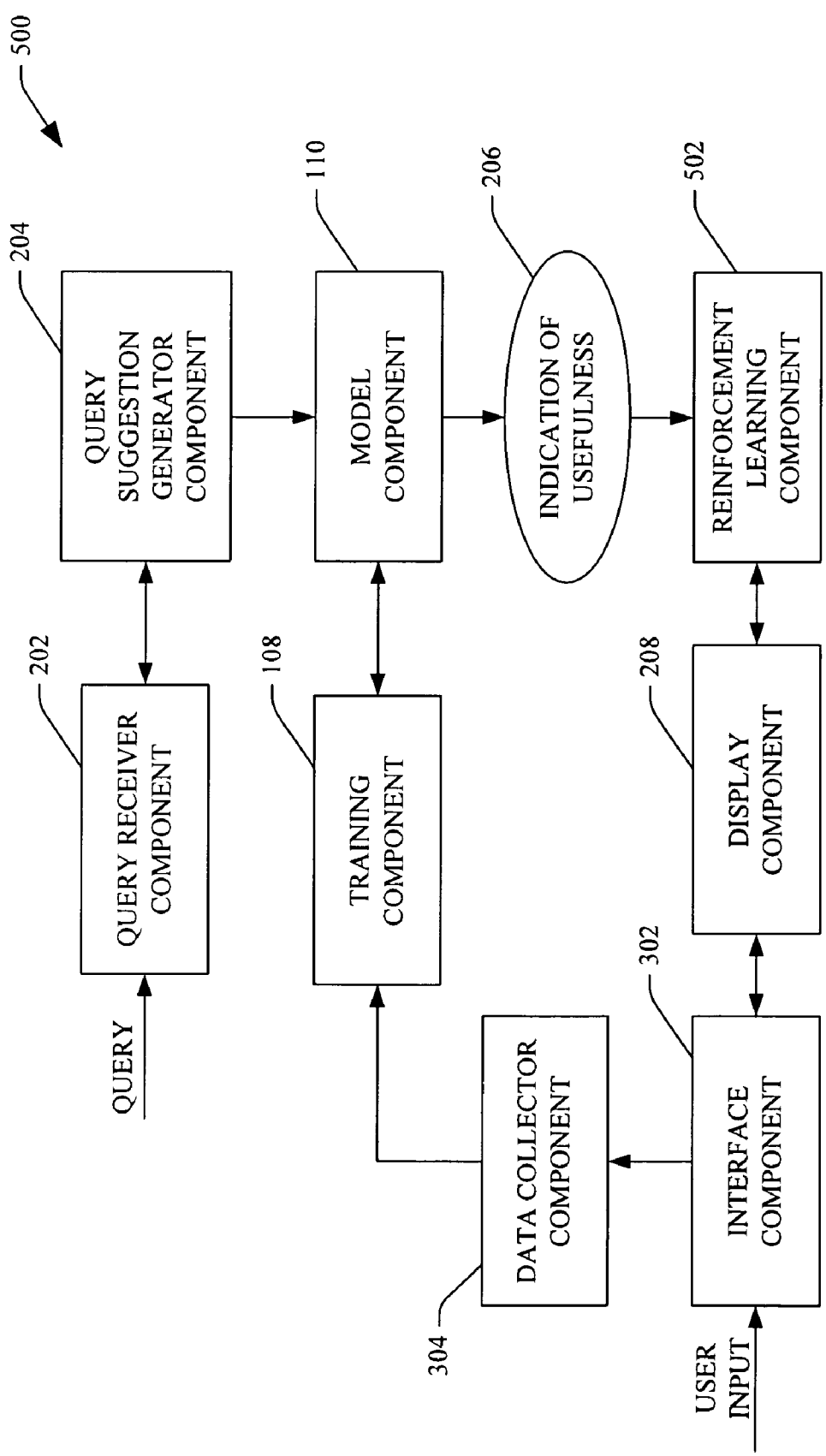
FIG. 5 is a functional block diagram of an example system that facilitates training a model component that models user behavior with respect to query suggestions.

Turning now to FIG. 5, an example system 500 that facilitates training a model component that models user behavior with respect to query suggestions is illustrated. The system 500 includes the query receiver component 202 and the query suggestion generator component 204, which act as described above. The model component 110 receives query suggestions and assigns an indication of usefulness 206 to each of the received query suggestions as described above. A reinforcement learning component 502 is also in communication with the model component 110, and may receive the indications of usefulness 206. The reinforcement learning component 502 can analyze the model component 110 and determine where additional user data may be helpful in further refining the model component 110. In other words, the reinforcement learning component 502 can be aware that queries shown may be future data used to train the model component 110. Accordingly, the reinforcement learning component 502 can select query suggestions to display to a user based upon how much (or little) data relating to the query suggestion has been used to train the model component 110. In addition, the reinforcement learning component 502 can perform a cost/benefit analysis with respect to collecting data for one or more candidate query suggestions. For example, the reinforcement learning component 502 can balance a benefit of collecting additional data that can be used to train the model component 110 with the cost (incurred by the user) of not being provided optimal or substantially optimal query suggestions.

The display component 208 can display query suggestions in accordance with indications of usefulness provided thereto by the model component 110 and/or query suggestions received from the reinforcement learning component 502. The interface component 302 receives user input, such as in the form of a different query, selections of a query suggestion, and/or the like. The data collector component 304 collects data pertaining to the user input received by the interface component 302. The training component 108 uses the data collected by the data collector component 304 to further refine/train the model component 110.

Figure 6:
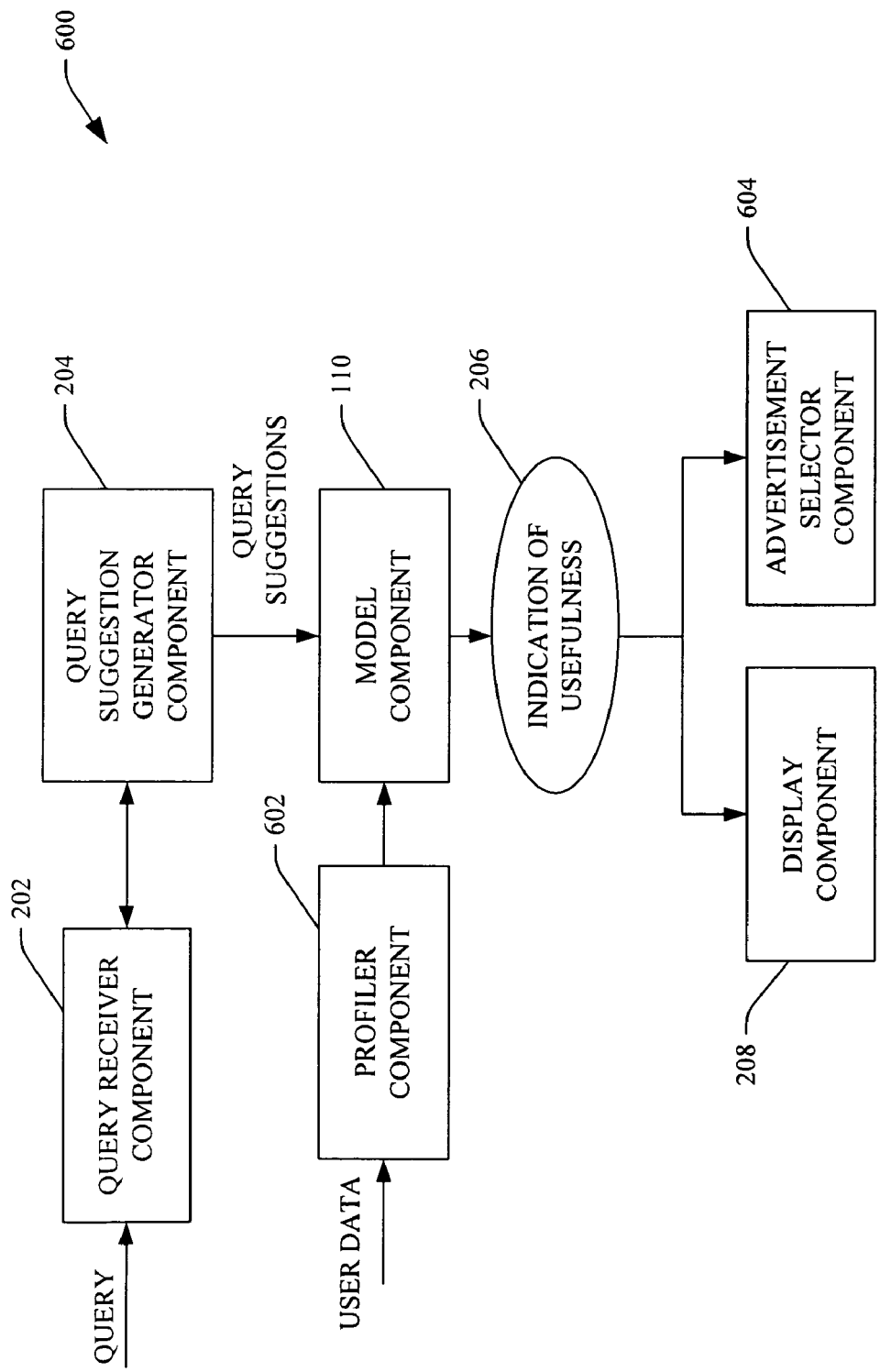
FIG. 6 is a functional block diagram of an example system that facilitates profiling a user.

Referring now to FIG. 6, an example system 600 that facilitates providing query suggestions to users is illustrated. The system 600 includes the query receiver component 202 and the query suggestion generator component 204, which act as described above. The system 600 also includes a profiler component 602 that receives user data and determines a profile of the user (the issuer of the query received by the query component 202). For instance, the profiler component 602 can receive data that indicates approximate age of the user, geographic location of the user, gender of the user, and/or other demographic data. Furthermore, the profiler component 602 may receive historical data of the user, which may be indicative of interests of the user. The user data received by the profiler component 602 may be explicitly provided by the user or implicitly determined based at least in part upon previous user actions. Once the profiler component 602 determines a profile to be assigned to the user, parameters of the model component 110 can be adjusted in accordance with the profile. For example, weights that correspond to features of queries and/or query suggestions can be selected based at least in part upon the selected profile.

The model component 110, with parameters weighted based at least in part upon a profile determined by the profiler component 602, receives query suggestions from the query suggestion generator component 204. The model component 110 can output the indication of usefulness for a query suggestion, such that each query suggestion received by the model component 110 is assigned a corresponding indication of usefulness. The display component 208 can display query suggestions based at least in part upon indications of usefulness corresponding thereto. An advertisement selector component 604 can also receive query suggestions that are to be displayed to the user and can select one or more advertisements to display based at least in part upon the query suggestions that are to be displayed. For example, if an initial query is "spider", and a suggested query that is to be provided to the user is "spider car", the advertisement selector component 604 may display an advertisement for a particular type of automobile.

With reference now to FIGS. 7-11, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. In addition, methodologies may be used herein in connection with a portable computing device to facilitate ease of data entry with respect to the portable computing device.

Figure 7:
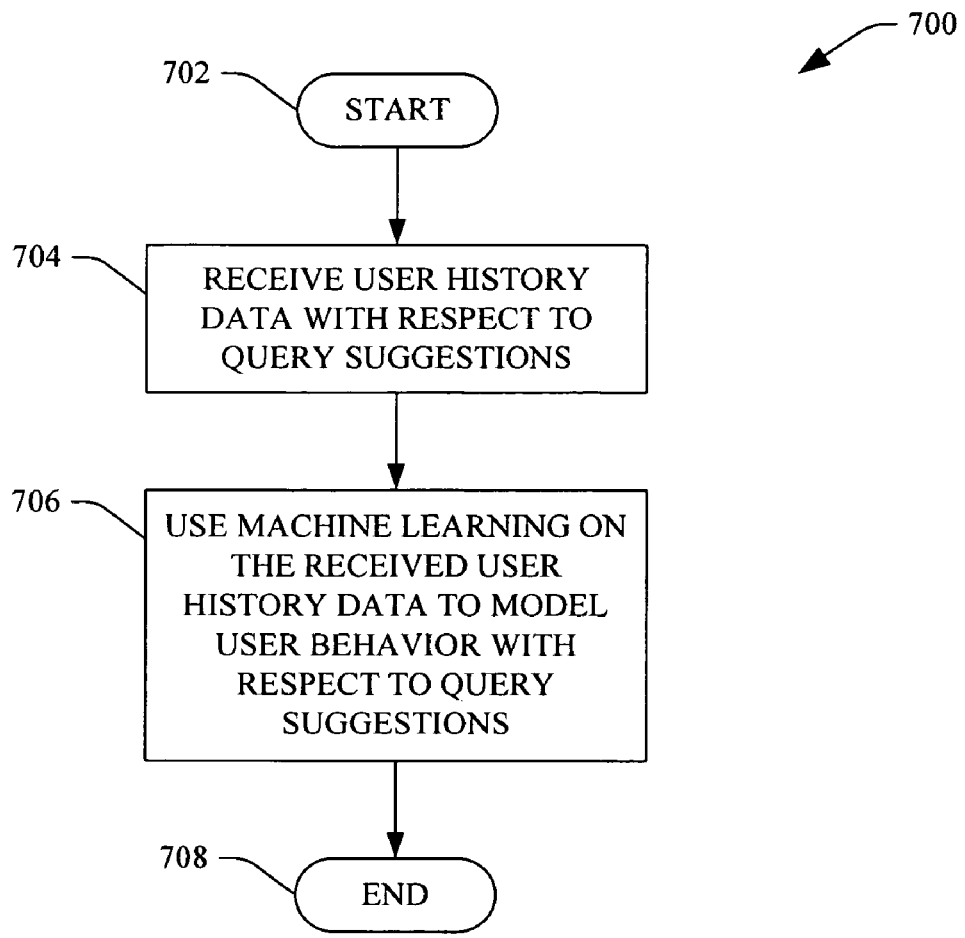
FIG. 7 is a flow diagram that illustrates an example methodology for training a model of user behavior with respect to query suggestions.

Referring specifically to FIG. 7, an example methodology 700 for training a computer-implemented model of user behavior with respect to query suggestions is illustrated. The methodology 700 starts at 702, and at 704 user history data with respect to query suggestions is received. Pursuant to an example, the user history data may relate to the interaction of several users with respect to a deployed query suggestion system. At 706, a machine learning model is used to model user behavior with respect to query suggestions. For example, a model of user behavior with respect to query suggestions can be trained, wherein the model of user behavior can be a logistic regression model and can be used to estimate a probability of a selection of a query suggestion followed by a selection of a search result and/or advertisement given the original query and the query suggestion. The methodology 700 completes at 708.

Figure 8:
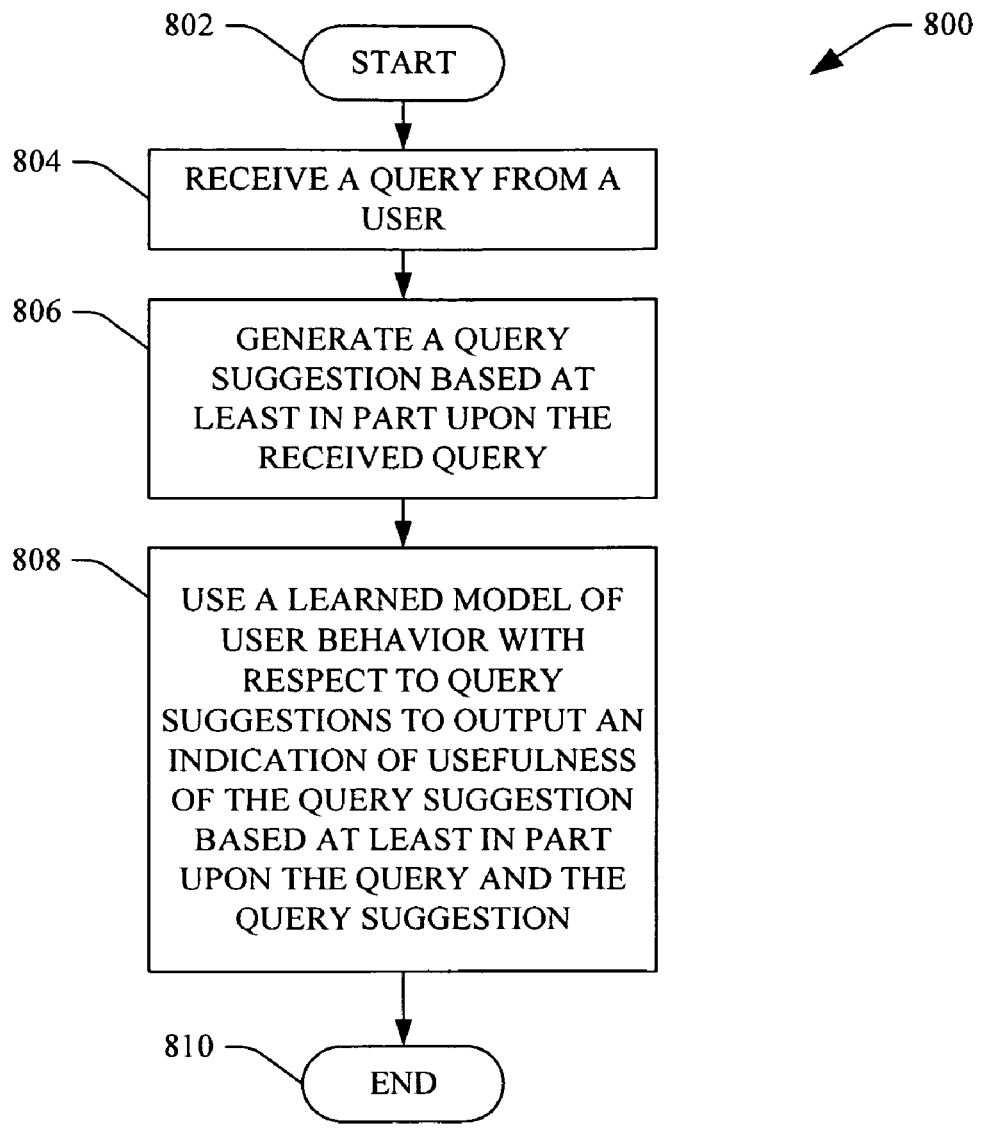
FIG. 8 is a flow diagram that illustrates an example methodology for outputting indications of usefulness for query suggestions.

Turning now to FIG. 8, an example methodology 800 for outputting an indication of usefulness with respect to a query suggestion is illustrated. The methodology 800 starts at 802, and at 804 a query is received from a user. At 806, a query suggestion is generated based at least in part upon the received query. In an example, a plurality of query suggestions can be generated based at least in part upon the received query. At 808, a learned model of user behavior with respect to query suggestions is used to output an indication of usefulness of the query suggestion. The indication of usefulness can be based at least in part upon the query received at 804 and the query suggestion generated at 806. Pursuant to an example, the indication of usefulness may be a probability that the user will select the query suggestion. In another example, the indication of usefulness may be a probability that the user will select the query suggestion and a search result and/or advertisement corresponding to the query suggestion. The methodology 800 completes at 810.

Figure 9:
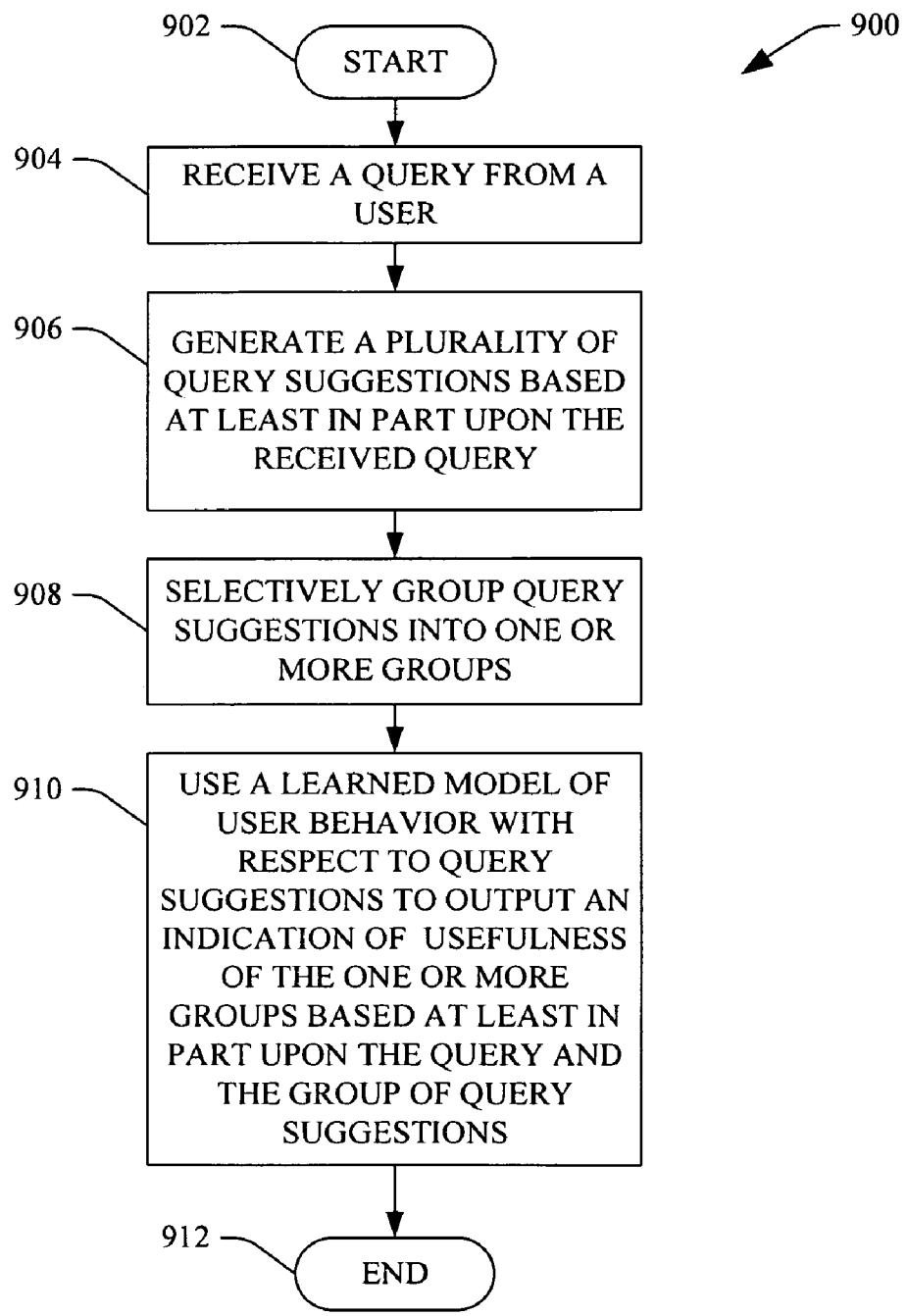
FIG. 9 is a flow diagram that illustrates an example methodology for outputting indications of usefulness for groups of query suggestions.

Referring now to FIG. 9, an example methodology 900 that facilitates outputting an indication of usefulness of a group of query suggestions is illustrated. The methodology 900 starts at 902, and at 904 a query is received from a user. At 906, a plurality of query suggestions are generated based at least in part upon the received query. At 908, query suggestions are selectively grouped into one or more groups. At 910, a learned model of user behavior with respect to query suggestions is used to output an indication of usefulness of the one or more groups of queries. The indication of usefulness of the one or more groups of queries is based at least in part upon the query received at 904 and the group of query suggestions. The methodology 900 completes at 912.

Figure 10:
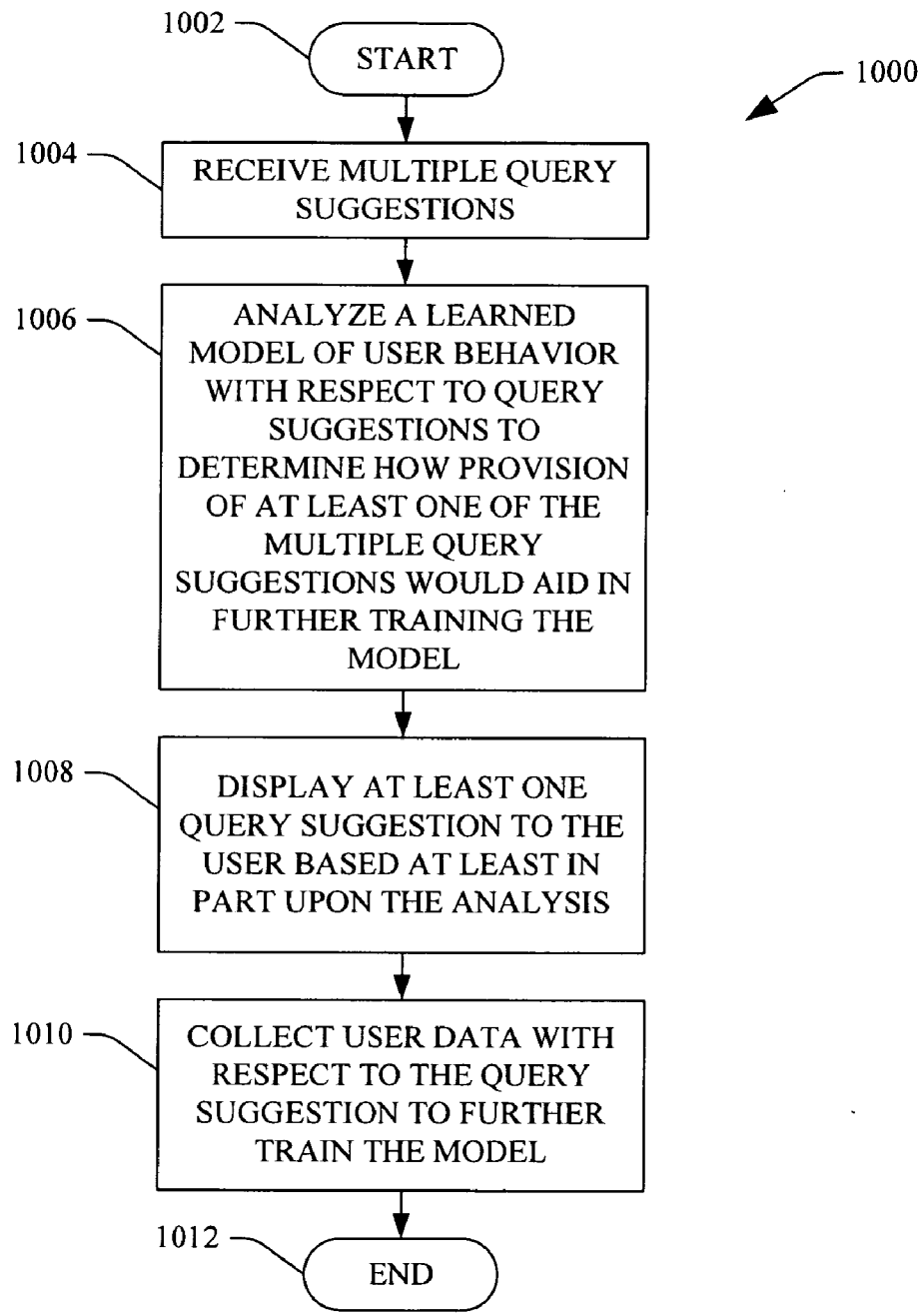
FIG. 10 is a flow diagram that illustrates an example methodology for training a model of user behavior with respect to query suggestions.

Turning now to FIG. 10, an example methodology 1000 that facilitates training a model of user behavior with respect to query suggestions is illustrated. The methodology 1000 starts at 1002, and at 1004 multiple query suggestions are received. At 1006, a learned model of user behavior is analyzed with respect to the received query suggestions to determine how provision of at least one of the multiple query suggestions would aid in further training the model. For instance, a particular query suggestion may allow for collection of data that would be helpful in further training the model. At 1008, at least one query suggestion is displayed to the user based at least in part upon the analysis undertaken at 1006. At 1010, user data is collected with respect to the query suggestion to further train the model. The methodology 1000 completes at 1012.

Figure 11:
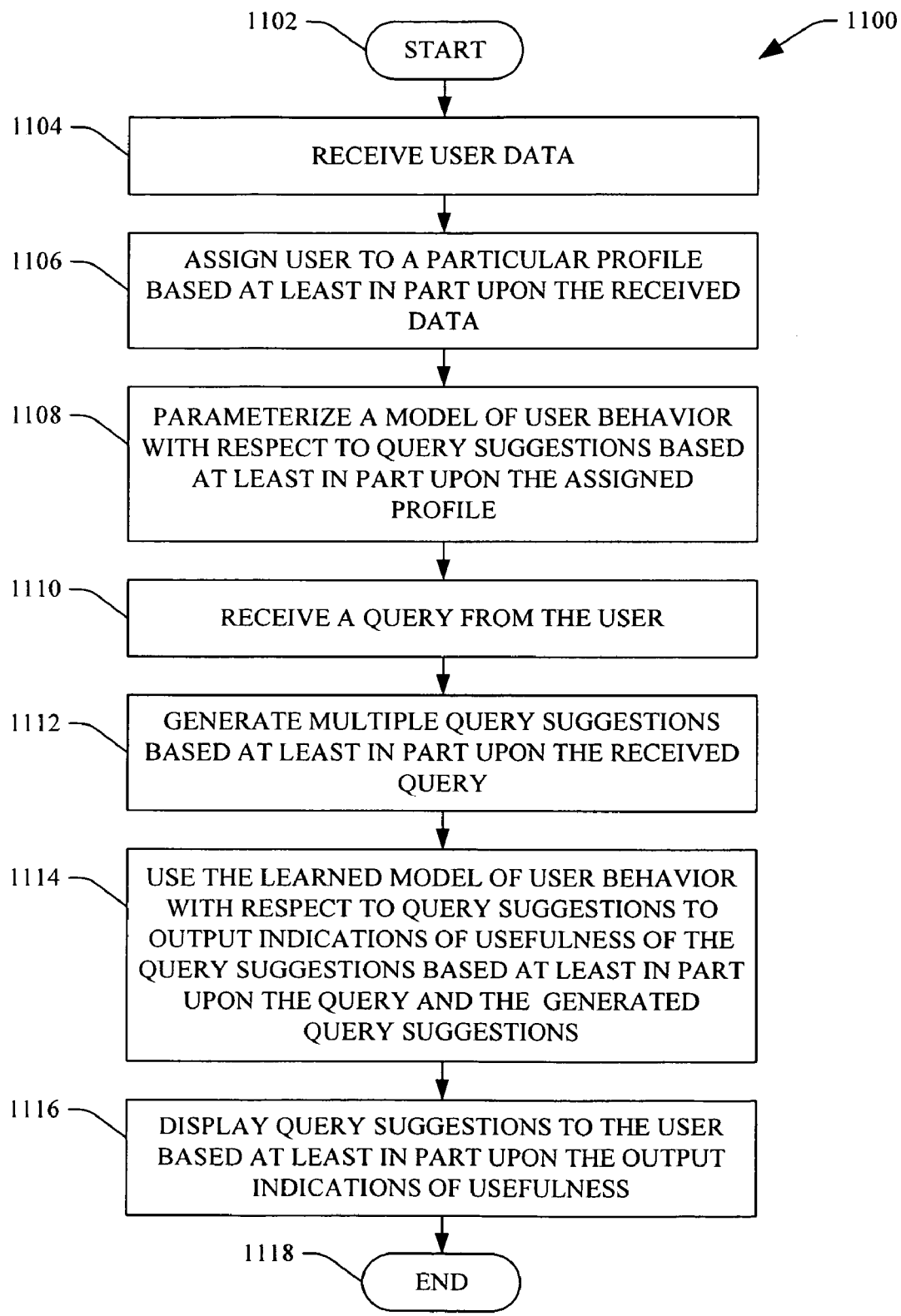
FIG. 11 is a flow diagram that illustrates an example methodology for displaying query suggestions to a user.

With reference now to FIG. 11, an example methodology 1100 for displaying query suggestions to a user is illustrated. The methodology 1100 starts at 1102, and at 1104 user data is received. The user data may be indicative of user identity, user interests, demographic information of the user, and/or the like. At 1106, the user is assigned to a particular profile based at least in part upon the received data. At 1108, a learned model of user behavior (with respect to query suggestions) is parameterized based at least in part upon the assigned profile.

At 1110, a query is received from the user. At 1112, multiple query suggestions are generated based at least in part upon the received query. At 1114, the learned model of user behavior with respect to query suggestions is used to output indications of usefulness of the query suggestions based at least in part upon the query received at 1110 and the query suggestions generated at 1112. At 1116, query suggestions are displayed to the user based at least in part upon the output indications of usefulness. For instance, a threshold number of query suggestions that correspond to the highest indications of usefulness can be displayed to the user. The methodology 1100 ends at 1118.

Figure 12:
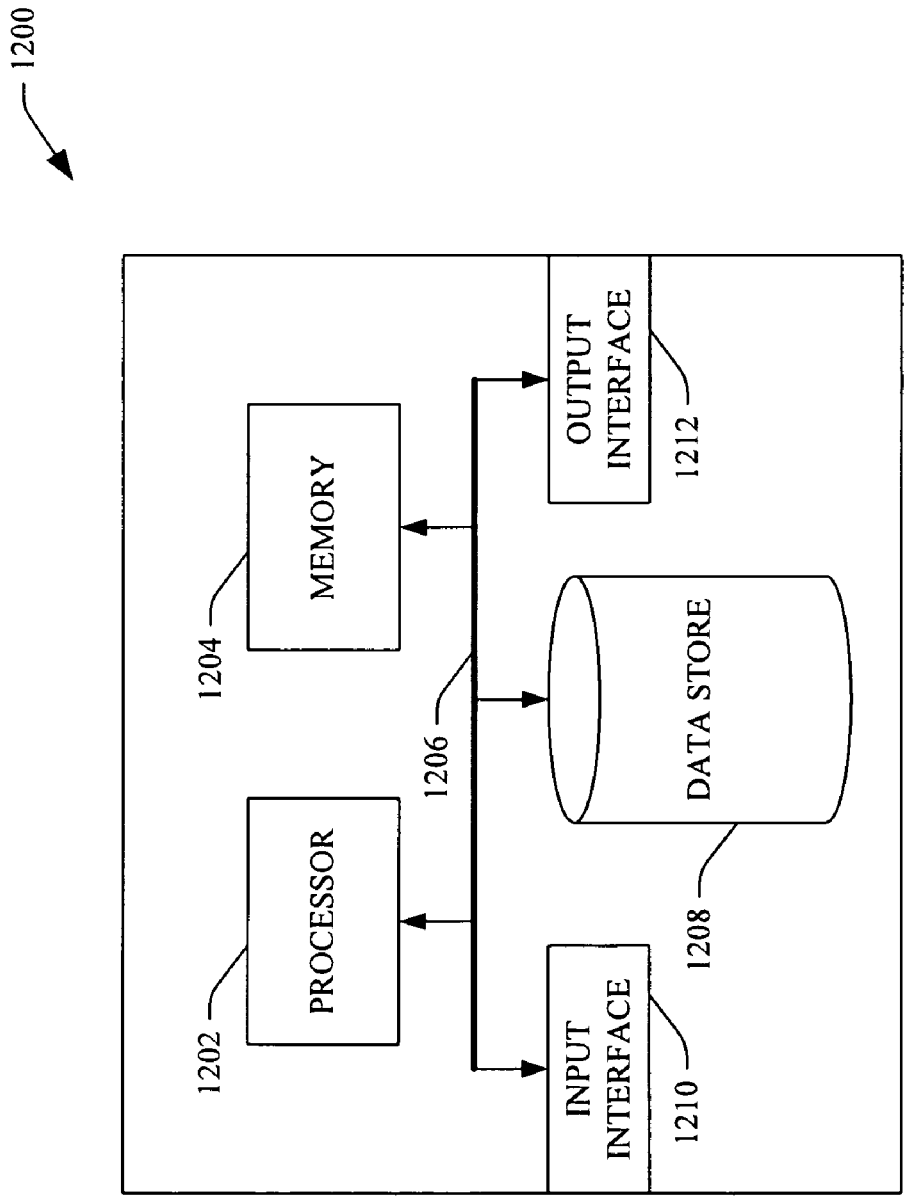
FIG. 12 is an example computing system.

Now referring to FIG. 12, a high-level illustration of an example computing device 1200 that can be used in accordance with the systems and methodologies disclosed herein is illustrated. For instance, the computing device 1200 may be used in a search engine system. In another example, at least a portion of the computing device 1200 may be used in a portable device. The computing device 1200 may be a server, or may be employed in devices that are conventionally thought of as client devices, such as personal computers, personal digital assistants, and the like. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory by way of a system bus 1206. In addition to storing executable instructions, the memory 904 may also store queries, query suggestions, search results, advertisements, etc.

The computing device 1200 additionally includes a data store 1208 that is accessible by the processor 1202 by way of the system bus 1206. The data store 1208 may include executable instructions, user history data, profile information, search results, labeled data, etc. The computing device 1200 also includes an input interface 1210 that allows external devices to communicate with the computing device 1200. For instance, the input interface 1210 may be used to receive queries from a user by way of a network, selections of search results from a user, selections of query suggestions from a user, etc. The computing device 1200 also includes an output interface 1212 that interfaces the computing device 1200 with one or more external devices. For example, the computing device 1200 may display query suggestions by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:
1. A system that facilitates outputting indications of usefulness of query suggestions, the system comprising:
   a processor; and
   a memory that comprises a plurality of components that are executable by the processor, the plurality of components comprising:

a query suggestion generator component that receives a query and generates a query suggestion based at least in part upon the received query;

a model component that outputs an indication of usefulness with respect to the query suggestion, wherein the model component is a logistic regression model that has been trained to model user interaction with query suggestions output by a search engine, wherein the logistic regression model has been trained based at least in part upon queries provided to the search engine by users, search results returned to the users subsequent to the search engine performing searches using the queries, search results selected by the users subsequent to the search results being returned to the users, query suggestions provided to the users responsive to the queries being provided to the search engine by the users, query suggestions selected by the users upon the users being provided with the query suggestions, and search results selected by the users subsequent to the users selecting the query suggestions; and a grouping component that groups query suggestions into a plurality of different groups, wherein the model component individually assigns an indication of usefulness to each of the groups of query suggestions, wherein the groups are assembled based at least in part upon an amount of overlap between search results that correspond to query suggestions.

2. The system of claim 1, wherein the indication of usefulness is a probability that the issuer of the query will select the query suggestion.

3. The system of claim 1, wherein the query suggestion generator component generates a plurality of query suggestions based at least in part upon the received query, and wherein the model component outputs an indication of usefulness for each of the plurality of query suggestions.

4. The system of claim 3, wherein the plurality of components further comprises a display component that selects query suggestions to display to an issuer of the query based at least in part upon the indications of usefulness that correspond to the plurality of query suggestions.

5. The system of claim 1, wherein the plurality of components further comprises:
a query receiver component that receives a partial query, wherein the partial query is received by the query suggestion generator component, the query suggestion component generates query suggestions based at least in part upon the received partial query.

6. The system of claim 1, wherein the plurality of components further comprises:
an interface component that receives user input with respect to the received query and/or the query suggestion that is presented to an issuer of the query; and
a data collector component that collects data pertaining to the user input, wherein the collected data is used to refine the model component.

7. The system of claim 1, wherein the query suggestion generator component generates a plurality of query suggestions based at least in part upon the received query, and wherein the plurality of components further comprises a reinforcement learning component that analyzes the model component to determine where additional data can be used to train the model component and performs a cost/benefit analysis with respect to candidate query suggestions, the reinforcement learning component selects a query suggestion to provide to an issuer of the query to accumulate additional data that is used to refine the model component.

8. The system of claim 1, wherein a mobile device comprises at least one of the query suggestion generator component and the model component.

9. The system of claim 1, wherein the plurality of components further comprises a profiler component that receives data pertaining to the issuer of the query and assigns the issuer of the query to a profile, wherein parameters of the model component are weighted in accordance with the assigned profile.

10. The system of claim 1, wherein the model component analyzes features of at least one of the query or query suggestion when outputting the indication of usefulness, the features comprising at least one of:
a type of transformation of the query;
frequency of issuance of the query suggestion;
relative popularity between the query and the query suggestion;
frequency that the query suggestion follows the query in a search session; or
features pertaining to search results corresponding to at least one of the query or the query suggestion.

11. A method that facilitates determining an indication of usefulness of a query suggestion with respect to a query, comprising the following computer-executable acts:
receiving the query from a user;
generating a plurality of query suggestions based at least in part upon the received query; causing a processor to create multiple groups of query suggestions from the plurality of generated query suggestions, wherein each of the multiple groups of query suggestions includes a plurality of query suggestions;
using a logistic regression model that has been trained from data that is indicative of user interaction with respect to query suggestions to output an indication of usefulness for each group of queries in the multiple groups of query suggestions based at least in part upon the received query, wherein query suggestions in a group of query suggestions with a highest indication of usefulness assigned thereto are presented to the user, wherein the data that is indicative of user interaction with respect to query suggestions comprises queries provided to a search engine by users, search results returned to the users subsequent to the search engine performing searches using the queries, search results selected by the users subsequent to the search results being returned to the users, query suggestions provided to the users responsive to the queries being provided to the search engine by the users, query suggestions selected by the users upon the users being provided with the query suggestions, and search results selected by the users subsequent to the users selecting the query suggestions.

12. The method of claim 11, further comprising:
using the logistic regression model to individually compute an indication of usefulness for each of the plurality of query suggestions; and
displaying query suggestions in an order that corresponds to indications of usefulness corresponding thereto.

13. The method of claim 11, wherein each created group of query suggestions comprises an equivalent number of query suggestions.

14. The method of claim 13, wherein the number of query suggestions in each group of query suggestions is equivalent to a predefined number of query suggestions that are to be presented to the user.

15. A computer-readable memory comprising instructions that, when executed by a processor, cause the processor to perform acts comprising:

receiving, at a search engine, a query issued by a user;

responsive to receiving the query, locating a plurality of candidate query suggestions that are based at least in part upon the query;

responsive to receiving the query, accessing a logistic regression model that has been trained to model user interaction with query suggestions output by the search engine, wherein the logistic regression model has been trained based at least in part upon queries provided to a search engine by users, search results returned to the users subsequent to the search engine performing searches using the queries, search results selected by the users subsequent to the search results being returned to the users, query suggestions provided to the users responsive to the queries being provided to the search engine by the users, query suggestions selected by the users upon the users being provided with the query suggestions, and search results selected by the users subsequent to the users selecting the query suggestions;

providing each query suggestion in the plurality of candidate query suggestions to the logistic regression model, wherein the logistic regression model is configured to output an indication of usefulness for each of the query suggestions in the plurality of candidate query suggestions upon receipt of each of the plurality of candidate query suggestions; and presenting at least one query suggestion from amongst the plurality of candidate query suggestions to the user subsequent to receiving the query issued by the user, wherein the at least one query suggestion is selected for presentment based at least in part upon the indication of usefulness for the query suggestion.

16. The computer-readable memory of claim 15, wherein the query issued by the user is non-existent in the queries provided to the search engine by users that were utilized to train the logistic regression model.

17. The computer-readable memory of claim 15, wherein an indication of usefulness output by the logistic regression model for a first query suggestion in the plurality of candidate query suggestions is based at least in part upon a constraint that a particular second query suggestion in the candidate query suggestions is to be presented to the user.

18. The computer-readable memory of claim 17, wherein the indication of usefulness output by the logistic regression model for the first query suggestion in the plurality of candidate query suggestions is based at least in part upon diversity of search results corresponding to the first query suggestion and the second query suggestion.

* * * * *